Dec. 26, 1950     A. L. CHRISTIANSEN     2,535,349
BULK FEED FISH MACHINE
Filed May 23, 1945                                                4 Sheets-Sheet 1
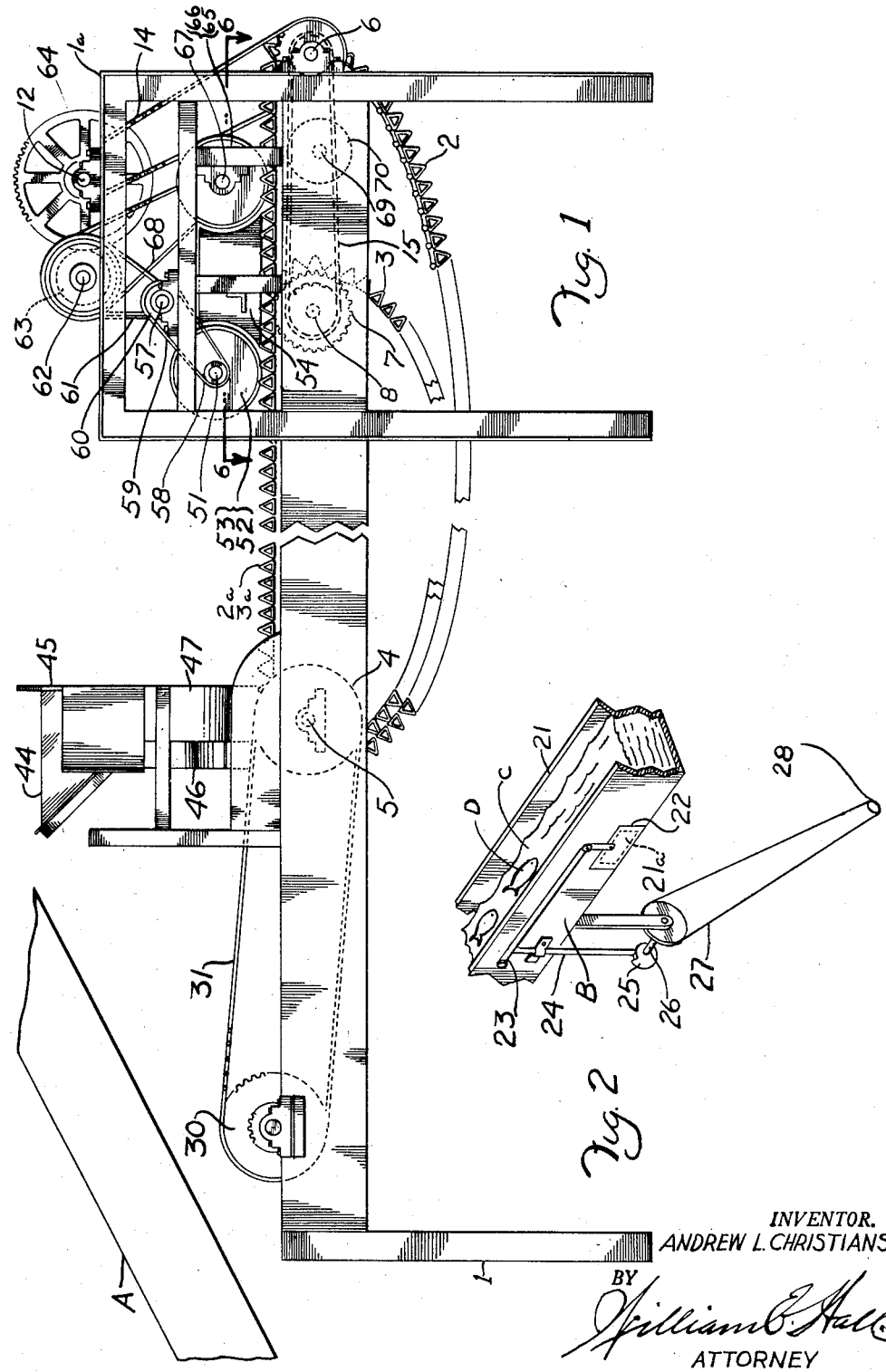
INVENTOR.
ANDREW L. CHRISTIANSEN
BY
William C. Hall
ATTORNEY Dec. 26, 1950   A. L. CHRISTIANSEN   2,535,349
BULK FEED FISH MACHINE Filed May 23, 1945   4 Sheets-Sheet 2

INVENTOR.
ANDREW L. CHRISTIANSEN
BY *William B. Hall*
ATTORNEY

Dec. 26, 1950     A. L. CHRISTIANSEN     2,535,349
BULK FEED FISH MACHINE
Filed May 23, 1945     4 Sheets-Sheet 3
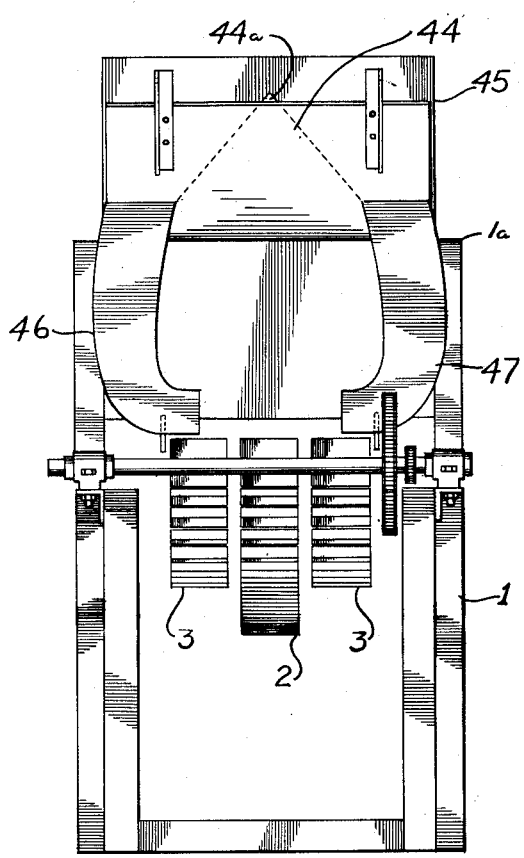
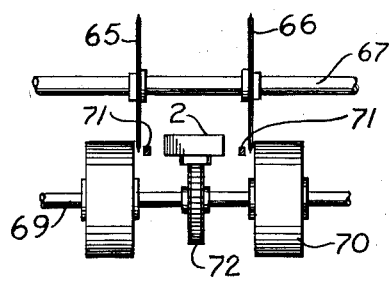
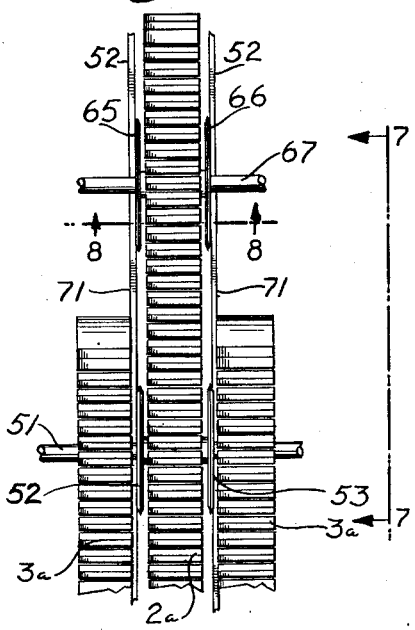
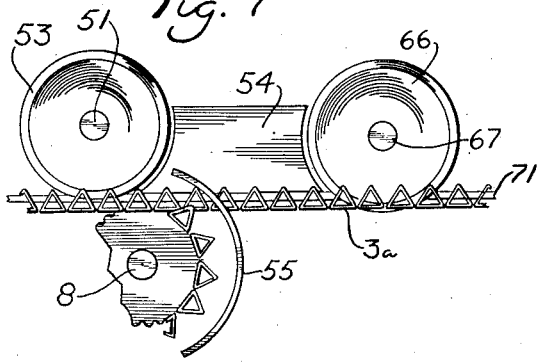
INVENTOR.
ANDREW L. CHRISTIANSEN
BY William E. Hall
ATTORNEY Dec. 26, 1950     A. L. CHRISTIANSEN     2,535,349
BULK FEED FISH MACHINE
Filed May 23, 1945     4 Sheets-Sheet 4
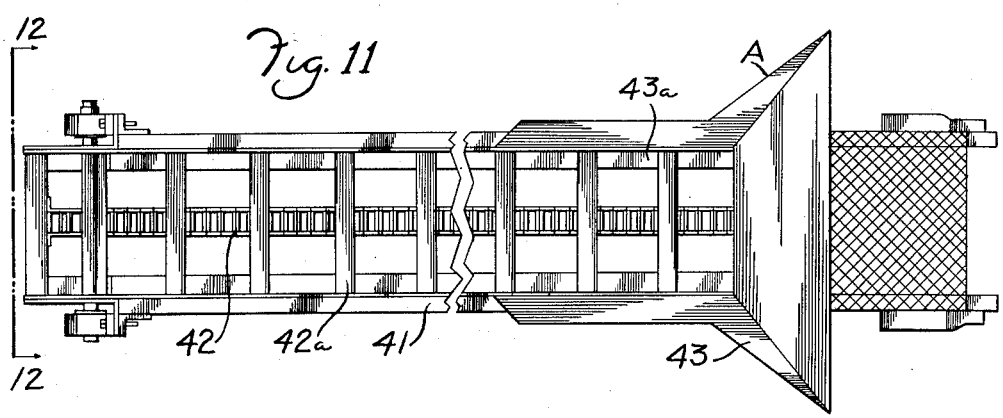
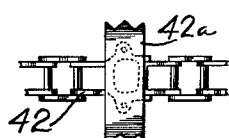
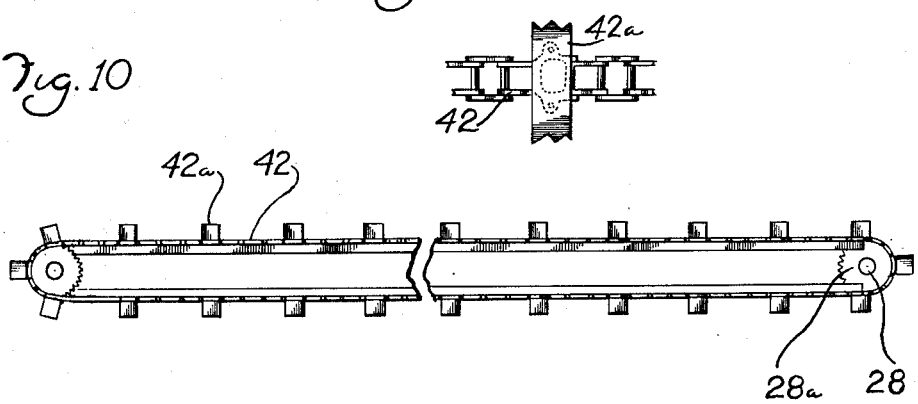
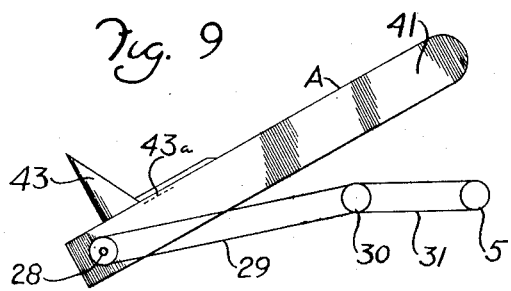
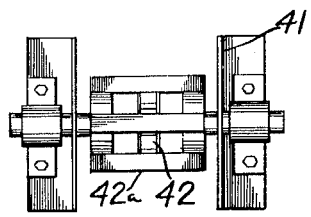
INVENTOR.
ANDREW L. CHRISTIANSEN
BY
*William E. Hall*
ATTORNEY Patented Dec. 26, 1950

2,535,349

UNITED STATES PATENT OFFICE 2,535,349

BULK FEED FISH MACHINE

Andrew L. Christiansen, Willowbrook, Calif.

Application May 23, 1945, Serial No. 595,423

19 Claims. (Cl. 17—2)

My invention relates to fish machines, and particularly to machines or apparatus into which fish in bulk quantities may be supplied for processing the same.

One of the principal objects of this invention is to provide an apparatus of this class whereby a plurality of processing machines are supplied by a unitary fish conveying means, and more particularly by a means which will periodically supply fish in predetermined quantities to such machines.

Another important object of this invention is to provide a novel means for supplying fish to one or more processing machines, by suspending or floating the fish in a body of water and periodically discharging the fish to said machine or machines with and while in suspension in the water.

An important object also of this invention is to provide novel means of supplying the fish while suspended in water, to means for discharging the fish in segregated state to a processing machine.

A further important object of this invention is to provide novel means of individually distributing fish with their heads foremost in successive pockets of a fish conveyor.

A still further important object of this invention is to provide a novel but simple arrangement of fish carrying pocket conveyors to facilitate severing of the heads of the fish carried thereby.

Another important object of this invention is to provide such novel and simple arrangement of conveyors for also removing the tails of the fish and for cutting the fish to packing or predetermined length.

A feature of this invention is to provide simple means for removing the heads and entrails of the fish.

Another novel feature of this invention is to provide simple means to facilitate the severing of the tails of the fish.

With these and other objects in view, as will appear hereinafter, I have devised a fish machine having certain novel features of construction, combination, and arrangement of parts and portions, as will be hereinafter described in detail and particularly set forth in the appended claims, reference being had to the accompanying drawings, and to the characters of reference thereon, which form a part of this application, in which:

Fig. 1 is a side elevational view of the processing unit of my fish machine incorporating my invention.

Fig. 2 is a fragmentary perspective view showing diagrammatically the means for supplying fish to various processing units, the figure showing the supply means in combination with a fish feed means shown in Fig. 1;

Fig. 5 is a front elevational view of the processing unit of my machine;

Fig. 6 is a diagrammatic view in plan of the unit taken through 6—6 of Fig. 1;

Fig. 7 is a diagrammatic elevational view thereof, taken at 7—7 of Fig. 6;

Fig. 8 is an enlarged fragmentary sectional elevational view thereof, taken through 8—8 of Fig. 6;

Fig. 9 is a diagrammatic view showing the fish feed means;

Fig. 10 is an enlarged fragmentary side view of the fish feed conveyor, showing the same in a horizontal position;

Fig. 11 is a top view of the fish feed conveyor within the enclosure of the fish feed means, shown in Fig. 10;

Fig. 12 is an end view of the fish feed conveyor and enclosure taken at 12—12 of Fig. 11; and, Fig. 13 is an enlarged fragmentary view of the construction of the fish feed conveyor of the fish feed means.

Figure 4:
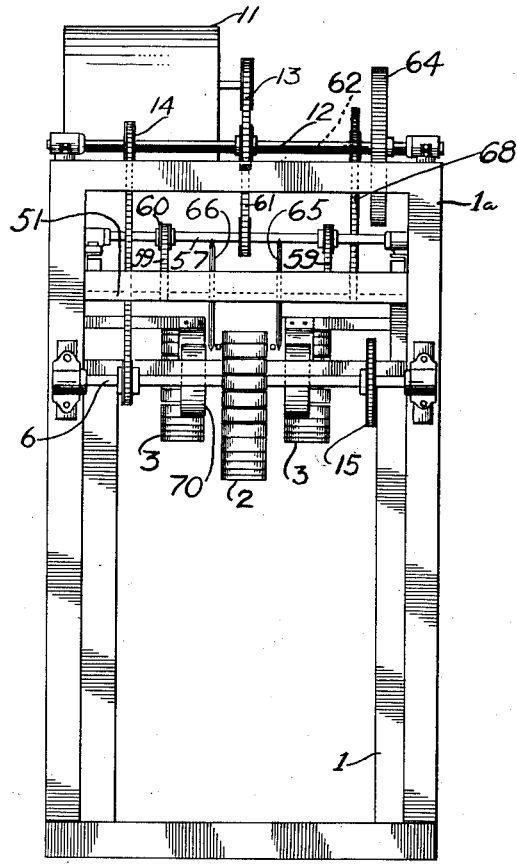
Fig. 4 is a rear elevational view of the processing unit of my machine.

This invention is an improvement over my former patent for a fish machine, No. 2,304,337, issued December 8, 1942.

The portion of the apparatus which I have termed the processing machine or unit is carried on a frame 1. On this frame are mounted three pocket conveyors, viz., a central conveyor 2, and flanking conveyors 3. The intake or feed ends extend around sprockets 4 mounted on the same shaft 5. The central conveyor 2 extends with its discharge end to the forward end of the frame 1 of the machine, while the discharge ends of the flanking conveyors 3 terminate short of such forward end. The discharge end of the central conveyor extends around a sprocket (not shown) mounted on a shaft 6, while the discharge ends of the flanking conveyors 3 extend around sprockets 7 carried on a shaft 8.

Near the discharge end of the machine frame 1 is provided a super-structure 1a on which may be carried the drive mechanism for the apparatus. This mechanism may be operated by an electric motor 11. This motor drives a shaft 12 through a chain 13. The shaft 12 drives, through a chain 14, the shaft 6 upon which the drive sprocket of the conveyor belt 2 is mounted. The shaft 6 is connected with the shaft 8 by means of a drive chain 15 for operating the shaft 8 at the same speed as the shaft 6.

Figure 3:
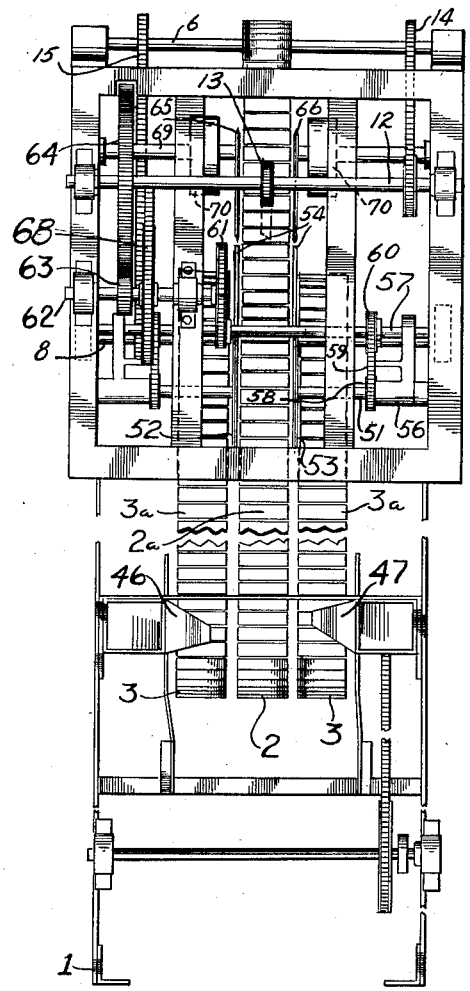
Fig. 3 is a fragmentary view of the processing unit of my machine in plan.

Each of the conveyors carry triangular cleats 2a and 3a, and those at the upper runs of the conveyors are aligned and provide continuous pockets extending transversely of all of the conveyors, as shown best in Figs. 3 and 6. Fish are fed into the pockets of these conveyors at the intake or feed ends by a fish feed or supply means presently to be described.

At the rear end of the frame 1 of each processing machine is a fish feed conveyor unit A. The feed conveyor unit of each of a plurality of such machines is supplied with fish from a unitary supply means B.

As shown, the supply means B comprises a fish supply conveyor in the form of a trough 21 in which is adapted to flow a stream of water C in which float or are suspended fish D which are adapted to be processed by processing units. The trough 21 has a plurality of discharge openings or outlets 21a, one for each of the processing units. Each of the openings 21a is normally closed by a gate 22 which is adapted to be separately raised by the mechanism operating the processing unit associated therewith. As shown, the gate is lifted by a lever 23 which is raised by a rod 24 operated by a cam 25. The cam 25 is mounted on a shaft 26 rotated through a drive chain 27 from a shaft 28. This shaft 28 which operates the feed conveyor unit A, presently to be described, is driven through a chain 29 from a shaft 30, which is shown connected through a chain 31 to the aforementioned shaft 5.

The fish feed unit A comprises a long frame 41, which is shown here as inclined upwardly over the rear end of the frame 1. Within the frame 41 is mounted a continuous conveyor 42 having transverse cleats 42a. The lower or rear end of the conveyor belt 42 extends around a sprocket 28a carried on the shaft 28 aforementioned. Over the rear end of the frame 41 is positioned a hopper 43 which is adapted to receive, preferably through a chute (not shown) fish suspended in the water discharged through the opening 21a. At the lower end of the hopper 43 is an opening 43a for discharging gradually the fish from the hopper 43 on to the conveyor belt 42.

From the upper end of the conveyor belt 42 the fish are discharged into a hopper 45, preferably cross-wise with respect to the crest 44a of a fish deflecting member 44 of angular construction, as shown best in Fig. 5. At the opposite ends of the hopper 45, the fish are discharged, usually with their heads foremost, into the small chutes 46 and 47, of gradually curved form, as shown in Fig. 5. The lower ends of these chutes terminate above the nearest flanking conveyor and at the opposite ends of the pocket of the central conveyor. In this manner the fish are discharged with their heads foremost into the conveying means, and with the heads in different directions. As shown in Figs. 1 and 3, the lower ends of the chutes 46 and 47 are staggered so that they are adapted to discharge fish into adjacent or successive pockets in the conveying means comprising the belt conveyors 2 and 3.

Operators are stationed at the opposite sides of the machine and both move the fish so that at least the heads extend beyond the side of the central conveyor, and further so that the fish lie in the pockets with their belly walls downwardly.

Near but above the discharge ends of the upper runs of the flanking conveyors 3 is a cutter drive shaft 51 carrying a pair of cutting discs or disc cutters 52 and 53, the lower cutting edges of which are spaced above the bottoms of the pockets of the conveyors 2 and 3, as shown best in Fig. 7. These cutters are adapted to cut the fish through the fleshy portions of the fish immediately behind the heads. As the fish are advanced by the conveying means, a stationary plate 54, one at either side of the central conveyor, enters the recess made by the disc cutter in line therewith and retains the fish in the pockets of the central conveyor, while the partly severed head engages the curved guard plate 55 positioned around the discharge end of the flanking conveyors 2 and 3. In this manner, the heads are removed, together with the entrails, and carried by the flanking conveyors until the same drop therefrom by gravity.

The shaft 51 on which the cutters 52 and 53 are mounted, is carried at the lower end of swinging frames 56, which are mounted on a shaft 57, and the shaft 51 is rotated by a sprocket 58 operated from a chain 59 extending over a sprocket 60 mounted on the shaft 57. The shaft 57 is driven by a chain 61 from a shaft 62 which is driven by the drive shaft 12 through a pinion 63 meshing with a gear 64 mounted on the drive shaft 12.

Forwardly of the cutters 52 and 53 are other cutters 65 and 66 arranged to cut the fish to length and to remove the tails of the fish. These cutters are also disc cutters and the lower cutting edges thereof extend below the pockets of the conveyor 2. These cutters 65 and 66 are mounted on an axially fixed shaft 67, which is rotated from the shaft 62 through a chain 68.

Below the central conveyor 2 is mounted a shaft 69 on which are carried rollers 70 which extend above the lower cutting edges of the cutters 65 and 66 and at the sides thereof opposite the conveyor 2.

Tails of fish are relatively flexible or yieldable with respect to the body and they tend to hang or droop downwardly from the ends of the pockets of the central conveyor 2. When the fish are carried in the conveyor 2, the tails pass over the rollers 70 and are thereby raised. Thus, the tails of the fish are positively severed from the bodies.

Between the conveyor 2 and the cutters 65 and 66 may also be provided guide rods 71 to facilitate raising of the intermediate portion of the fish. The cutters 65 and 66 extend downwardly between the rollers 70 and rods 71, providing a double support for the fish for the operation of the cutters to cut off the tails.

The shaft 69, carrying the rollers 70, may be operated by a sprocket 72 connected to and driven by the chain of the central conveyor 2, as shown in Fig. 6.

Though I have shown and described a particular construction, combination, and arrangement of parts and portions, I do not wish to be limited to the same, but desire to include in the scope of my invention the construction, combination, and arrangement substantially as set forth in the appended claims.

I claim:

1. In a means of the class described, a fish processing unit, means of operating the same, conveying means for periodically supplying fish in predetermined bulk amounts to said unit, and mechanism synchronizing the operation of the latter with said operating means.

2. In a means of the class described, a fish processing unit, means for supplying fish to said unit, said means comprising a receptacle containing water in which fish are adapted to float and provided with a discharge opening, a gate for the receptacle adapted to uncover the opening to permit discharge of fish to said processing unit, and means, synchronized with the unit, for operating the gate.

3. In a means of the class described, a fish processing unit, means for supplying fish to said unit, said means comprising a trough containing a moving body of water in which fish are adapted to float and to be conveyed, said trough having a discharge opening for said processing unit, a gate for the trough opening adapted to uncover the opening to permit discharge of fish to the processing unit, and means, synchronized with the unit, for operating the gate.

4. In a means of the class described, a fish processing machine having a conveyor provided with transverse pockets, means for supplying fish to one end of said conveyor, said means being directed to and adapted to communicate with successive pockets of the conveyor and at opposite ends of the pockets.

5. In a means of the class described, a fish processing machine having a conveyor provided with transverse pockets, means for supplying fish to one end of said conveyor, said means comprising a pair of chutes extending therefrom, each chute being directed to and adapted to communicate with successive pockets of the conveyor for directing fish into the pockets from opposite ends thereof.

6. In a means of the class described, a fish processing unit provided with a conveyor having transverse fish carrying pockets, conveying means for periodically supplying fish in predetermined bulk amounts to said unit, mechanism synchronizing the operation of the conveying means with said conveyor, and distributing means, in association with the conveying means and directed to and adapted to communicate with successive pockets of the conveyor and at opposite ends of the pockets.

7. In a means of the class described, a fish processing unit having a conveyor provided with transverse pockets, means for supplying fish to said unit, said means comprising a receptacle containing water in which fish are adapted to float and provided with a discharge opening, a gate for the receptacle opening adapted to uncover the opening to permit the discharge of fish, and fish distributing means having a hopper for receiving water and fish suspended therein from said supply means, said distributing means connecting said supply means with the processing unit for directing fish to successive pockets of the conveyor and at opposite ends of the pockets.

8. In a means of the class described, a fish processing unit having a conveyor provided with transverse pockets, means for supplying fish to said unit, said means comprising a receptacle containing water in which fish are adapted to float and provided with a discharge opening, a gate for the receptacle opening adapted to uncover the opening to permit the discharge of fish, and fish distributing means connecting said supply means with the processing unit, said distributing means comprising a pair of chutes extending therefrom, each chute being directed to and adapted to communicate with successive pockets of the conveyor and at opposite ends of the pockets.

9. In a means of the class described, a processing machine comprising a conveyor having transverse pockets for conveying fish transversely, means, synchronized with the conveyor, for supplying fish thereto, said means comprising a pair of chutes extending therefrom, each chute being directed to and adapted to communicate with successive pockets of the conveyor and at opposite ends of the pockets.

10. In a means of the class described, a processing unit comprising a conveyor having transverse pockets for conveying fish transversely, and means, synchronized with the conveyor, for supplying fish thereto, said means comprising an upwardly inclined feed conveyor, the upper end terminating above and capable of discharging fish into the pocket conveyor, and a pair of chutes extending from the discharge end of the feed conveyor, each chute being directed and adapted to communicate with successive pockets of the conveyor and at opposite ends of the pockets.

11. In a machine of the class described, a plurality of endless transverse-pocket conveyors comprising a central conveyor and a flanking conveyor at either side of the former, the pockets of the upper runs of all conveyors being synchronized and aligned, and the discharge end of the central conveyor extending beyond the discharge ends of the flanking conveyors, and a pair of single partial-head-severing cutters, one positioned at either side of the central conveyor and between the latter and the adjacent flanking conveyor, the lower portions of the cutters being positioned above the bottoms of the pockets to provide only partial severing of the heads of fish whether the heads are extended in one direction or the other in said pockets.

12. In a machine of the class described, a plurality of endless transverse-pocket conveyors comprising a central conveyor and a flanking conveyor at either side of the former, the pockets of the upper runs of all conveyors being synchronized and aligned and the discharge end of the central conveyor extending beyond the discharge ends of the flanking conveyors, a pair of head severing cutters, one positioned at either side of the central conveyor and between the latter and the adjacent flanking conveyor, the lower portions of the cutters being positioned above the bottom of the pockets, and other cutters positioned at the opposite sides of the central conveyor and forwardly of the discharge ends of the flanking conveyors, the lower portions of the latter cutters being positioned below the bottoms of the pockets.

13. In a machine of the class described, a plurality of endless transverse-pocket conveyors comprising a central conveyor and a flanking conveyor at either side of the former, the pockets of the upper runs of all conveyors being synchronized and aligned and the discharge end of the central conveyor extending beyond the discharge ends of the flanking conveyors, a cutter shaft mounted above the conveyors parallel to the pockets, and a pair of disc cutters carried by the shaft, one cutter being positioned at either side of the central conveyor and between the latter and the adjacent flanking conveyor, the lower portions of the cutters being positioned above the bottoms of the pockets, a second cutter shaft mounted above the central conveyor and parallel to the pockets therein, and a pair of disc cutters carried by the latter shaft, the lower portions of each of the latter cutters being positioned below the bottoms of the pockets.

14. In a machine of the class described, an endless conveyor having transverse pockets, a second endless conveyor having transverse pockets, the pockets in the upper runs of both conveyors being aligned, a cutter positioned between said conveyors, a retaining plate positioned at one side of the first conveyor in alignment with the cutter and forwardly of the second conveyor, and a guard plate positioned at one side of the cutter and extending forwardly thereof around the discharge end of the second conveyor.

15. In a machine of the class described, a plurality of endless transverse-pocket conveyors comprising a central conveyor and a flanking conveyor at either side of the former, the pockets of the upper runs of all conveyors being synchronized and aligned, and the discharge end of the central conveyor extending beyond the discharge ends of the flanking conveyors, means for supplying fish to the pockets of the conveyors with the heads extending in either direction, and a pair of single partial-head-severing cutters, one positioned at either side of the central conveyor and between the latter and the adjacent flanking conveyor, the lower portions of the cutters being positioned above the bottom of the pockets.

16. In a machine of the class described, a conveyor having transverse pockets for carrying fish, a roller mounted on an axis parallel to but below the pockets, the upper portion of the roller extending above the bottom of the pockets, portions of the fish carried in the pockets of the conveyor being adapted to ride over said roller, and a cutter positioned between the conveyor and the roller for severing from the body of the fish carried in the pockets of the conveyor the portion riding over the rollers.

17. In a machine of the class described, a conveyor having transverse pockets for carrying fish, a roller mounted on an axis parallel to but below the pockets, portions of the fish carried in the pockets of the conveyor being adapted to ride over said roller, and a cutter positioned between the conveyor and the roller for severing from the body of the fish carried in the pockets of the conveyor the portion riding over the rollers, the upper portion of the roller extending above the bottom portion of the cutter.

18. In a machine of the class described, a conveyor having transverse pockets for carrying fish, a roller mounted on an axis parallel to but below the pockets, portions of the fish carried in the pockets of the conveyor being adapted to ride over said roller, a cutter positioned between the conveyor and the roller for severing from the body of the fish carried in the pockets of the conveyor the portion riding over the rollers, the upper portion of the roller extending above the bottom portion of the cutter, and a guide ledge between the cutter and the conveyor, the top of the guide ledge being also positioned above the bottom portion of the cutter.

19. In a machine of the class described, a conveyor having transverse pockets for carrying fish, a cutter positioned at and spaced from the side of the conveyor, and guide means positioned at the side of the cutter opposite the conveyor, the top of the guide means extending above the bottom portion of the cutter and above the bottom of the pockets, the guide means being upwardly inclined for gradually raising the drooping portions of the fish carried in the pockets of the conveyor above the lower portion of the cutter.

ANDREW L. CHRISTIANSEN.

REFERENCES CITED

The following references are of record in the file of this patent:

UNITED STATES PATENTS

| Number | Name | Date |
| --- | --- | --- |
| 1,377,465 | Cox | May 10, 1921 |
| 1,699,951 | Christiansen et al. | Jan. 22, 1929 |
| 1,982,901 | Burr | Dec. 4, 1934 |
| 2,304,337 | Christiansen | Dec. 8, 1942 |

FOREIGN PATENTS

| Number | Country | Date |
| --- | --- | --- |
| 763,392 | France | Feb. 12, 1934 |